March 28, 1939.  H. R. TEAR  2,152,334
LUBRICATING DEVICE
Filed Jan. 5, 1938  2 Sheets-Sheet 1
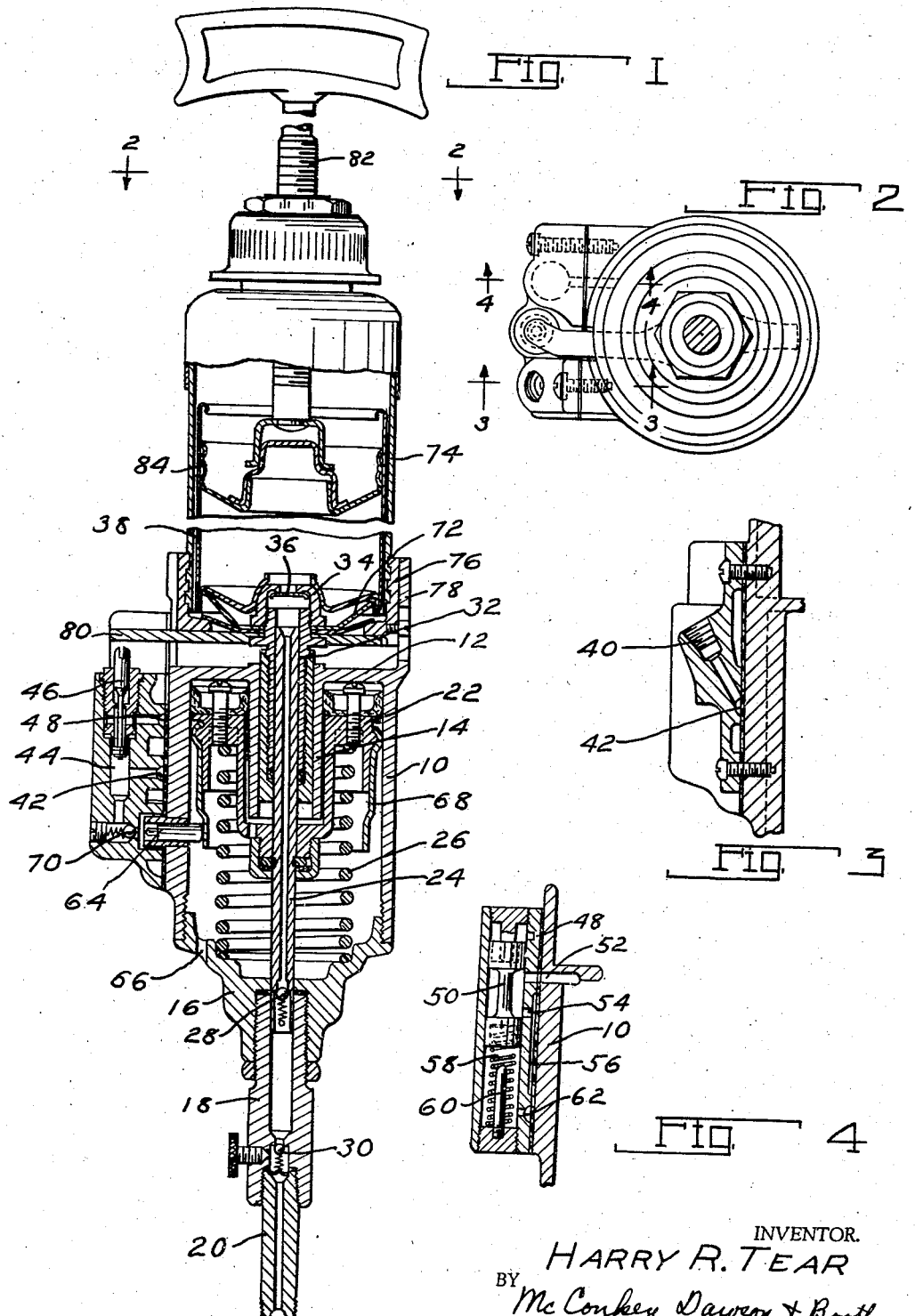
INVENTOR.
HARRY R. TEAR
BY McConkey Dawson & Booth
ATTORNEYS.

March 28, 1939. H. R. TEAR 2,152,334
LUBRICATING DEVICE
Filed Jan. 5, 1938 2 Sheets—Sheet 2
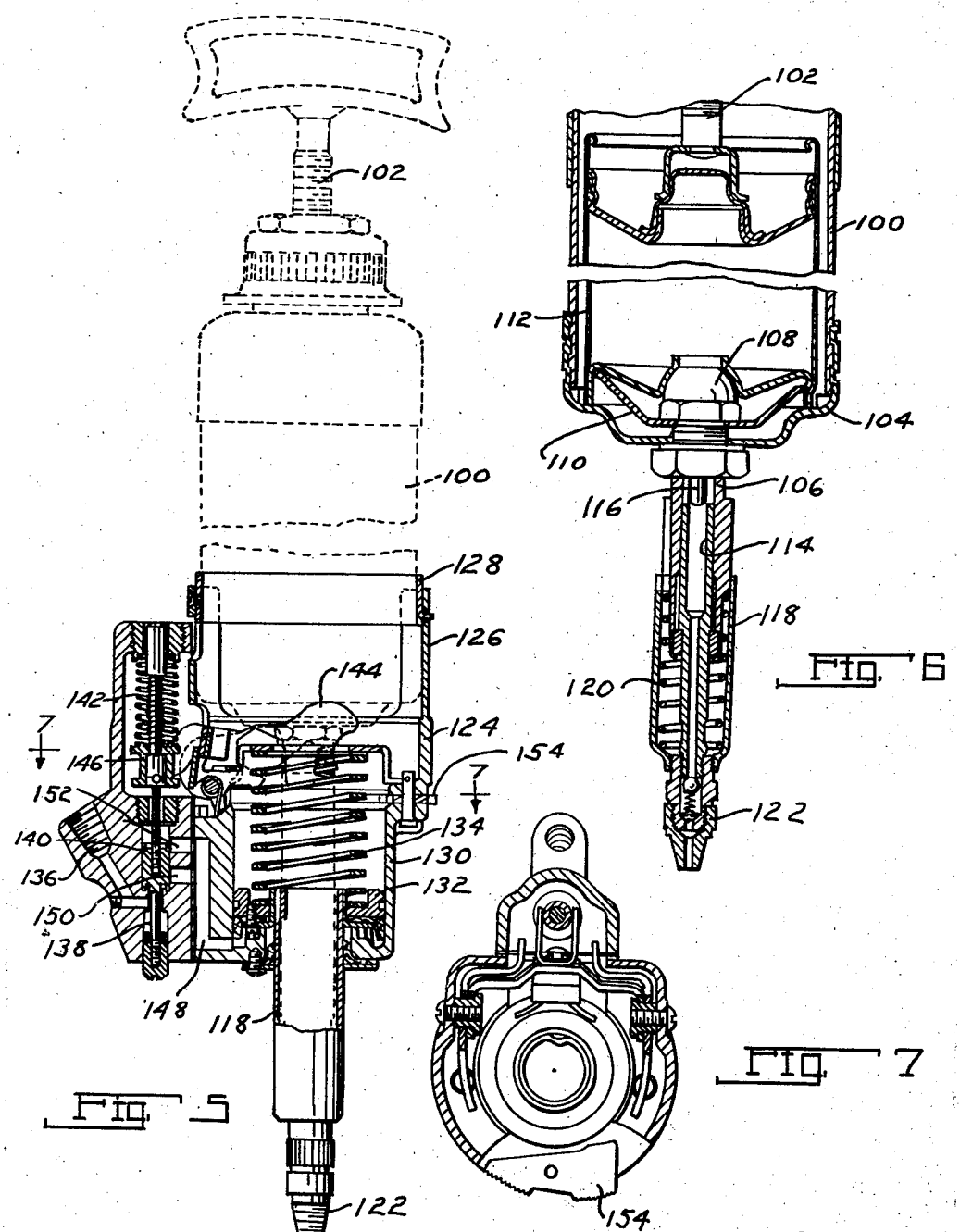
INVENTOR.
HARRY R. TEAR
BY McConkey Dawson & Booth
ATTORNEYS.

Patented Mar. 28, 1939

2,152,334

UNITED STATES PATENT OFFICE 2,152,334

LUBRICATING DEVICE

Harry R. Tear, Des Moines, Iowa, assignor to The Lubrication Corporation, Chicago, Ill., a corporation of Illinois Application January 5, 1938, Serial No. 183,444

17 Claims. (Cl. 221—47.4)

This invention relates to lubricating devices and more particularly to portable power-operated lubricant dispensers.

In portable power-operated lubricant dispensers as heretofore proposed it has been necessary for an operator to use two hands; one to handle the nozzle or coupler and the other to operate the control mechanism for the power unit. This makes it impossible for the operator to manipulate other mechanisms such as bars or the like to free tight bearings and is otherwise burdensome. It is accordingly one of the objects of the present invention to provide a lubricant dispenser which can be operated with one hand.

Another object of the invention is to provide a power operated portable dispenser in which the power unit is controlled by thrusting the dispenser against a receiving fitting.

Another object of the invention is to provide a power unit for a lubricant dispenser in which the power unit is controlled by handling the dispenser in the normal manner for manual operation.

Other objects, advantages and novel features of the invention will be apparent from the following description when read in connection with the accompanying drawings, in which:

Figure 1 is a longitudinal section with parts in elevation of a lubricating device embodying the invention;

Figure 2 is a section on the line 2—2 of Figure 1;

Figures 3 and 4 are sections on the lines 3—3 and 4—4 respectively of Figure 2;

Figure 5 is a view similar to Figure 1 of a modified construction;

Figure 6 is a central section of the grease gun of Figure 5; and

Figure 7 is a section on the line 7—7 of Figure 5.

Figure 1 illustrates a portable power operated lubricant dispenser comprising a power cylinder 10 closed at one end by a transverse wall 12 having an axial tubular extension 14 and with a head 16 removably closing its opposite end. The head 16 carries a high pressure cylinder 18 terminating in a rigid nozzle 20 of any desired type formed for sealing engagement with a lubricant receiving fitting.

A power piston 22 is slidably mounted in the cylinder 10 and is formed with an annular packing sealing against the inner surface of the cylinder 10 and the outer wall of the tubular extension 14. The piston is secured to a tubular plunger 24 intermediate the ends thereof and is adapted to be urged in a forward direction by fluid under pressure and in the reverse direction by a suitable return spring 26. A suitable check valve 28 is provided in the plunger 24 to prevent rearward flow of fluid therethrough.

The forward end of the plunger 24 is slidable in the high pressure cylinder 18 which is preferably provided with an outlet check valve 30 and the rearward end of the plunger is slidable in a cylinder 32 which is in turn slidably mounted in the extension 14. The cylinder 32 terminates in an inlet stud 34 having an inlet check valve 36 and formed for sealing engagement around the outlet opening of a lubricant cartridge 38 as more particularly described and claimed in the patent to Dodge 1,987,002.

Operating fluid is supplied to the cylinder 10 through a suitable flexible hose or the like not shown which is connected to a threaded socket 40. Fluid entering the socket flows into a groove 42 which communicates with a valve chamber 44 controlled by a valve 46. The valve 46 controls communication between the groove 42 and a second groove 48 which leads to one end of an automatic spool valve 50 as best seen in Figure 4. The spool valve 50 controls a port 52 leading into the rearward end of the cylinder 10 and a port 54 communicating with an exhaust passage 56. A spring 58 normally urges the valve 50 to its exhaust position as shown in Figure 4 and a stop 60 serves to limit movement of the valve in response to air pressure as will be described hereafter. The end of valve 50 opposite the groove 48 communicates with atmosphere through a groove 62, past a slotted plunger 64 and through an exhaust port 66 in the head 16. The plunger 64 is controlled by a skirt 68 on the piston 22 and has a reduced end adapted to control check valve 70 which controls communication between the valve chamber 44 and the groove 62.

The lubricant cartridge 38 is secured to the stud 34 by a connector plate 72 and is enclosed by a casing 74 which is screw threaded to a ring 76. The ring 76 is slidably mounted in a tubular extension 78 on the cylinder 10 and carries an operating bar 80 in register with the valve 46. The casing 74 carries a feed screw 82 adapted to engage a piston 84 forming a movable enclosure for the cartridge to force lubricant from the cartridge into the pump.

In operation a cartridge is placed in the dispenser as shown in Figure 1 and the nozzle 20 is placed against a fitting to be serviced. If a thrust is then exerted on the feed screw 82 or the casing 74, the casing and ring 76 will slide forward moving the operating bar into engagement with the valve 46 to open the valve. At this time, air will flow from the valve chamber 44 through groove 48 and will act on the end of the spool valve 50 to force it down against the stub 60. In this position groove 48 and port 52 will be in communication to admit fluid under pressure to the rear side of the piston 22 to move it through the cylinder 10. At this time any lubricant in the cylinder 18 will be forced out through the nozzle under high pressure by the tubular plunger 24.

As the piston 22 moves forwardly, the skirt 68 will cam the plunger 64 outwardly closing the groove therein. As the piston 22 reaches the end of its working stroke, the skirt 68 will cam the plunger 64 further outwardly to open the check valve 70. This permits air to flow from the valve chamber 44 through the groove 62 to act on the opposite end of the valve 50 thereby balancing the air pressures on the ends of valve 50. At this time valve 50 will be returned to the exhaust position shown in Figure 4 under the influence of spring 68 and the port 52 will be in communication with the exhaust port 54. Thus pressure is removed from the piston 22 and it will return to the position of Figure 1 under the influence of spring 26. At this time check valve 30 will close and lubricant will flow from the cartridge past check valve 36 and through the plunger 24 into the cylinder 18.

When the piston 22 has returned to the position of Figure 1, the plunger 64 moves outwardly to connect the lower end of valve 50 to exhaust through the groove 62 and the slot in the plunger. Since valve 50 is now unbalanced, it will move down under the influence of air pressure on its upper end to again connect groove 48 with port 52 and the operation will be repeated. Thus, so long as a thrust is exerted on the casing 74 to hold valve 46 open, the pump will operate automatically. As soon as this thrust is released, the valve 46 will return to its closed position and operation of the pump will stop.

Figures 5 to 7 illustrate a modified construction particularly adapted for use as an attachment to a grease gun of the type more particularly described and claimed in the patent to Tear No. 2,049,182. As shown, this gun comprises a housing 100 through one end of which a feed screw 102 extends for engagement with the cartridge piston. The opposite end of the housing 100 is closed by a screw threaded head 104 which carries a thrust operating pump mechanism. The pump mechanism includes a sleeve 106 having an inlet stud 108 and a connector plate 110 for connection with a lubricant cartridge 112. A tubular piston 114 is slidable in the sleeve 106 and is adapted to fit over a plunger 116 which is rigidly secured within the sleeve. An outer sleeve 118 is secured to the plunger 114 and slides over the sleeve 106, a spring 120 being provided to urge the sleeve 118 outwardly. Any suitable nozzle 122 may be secured to the outer end of the sleeve 118 in communication with the cylinder 114.

The power attachment includes a body portion 124 having a plurality of fingers 126 adapted to slip over the head 104 and to be secured thereto by a removable ring 128. The body is formed with a power cylinder 130 slidably receiving a piston 132 which is urged forwardly to the position shown by a coil spring 134. The piston is rigidly secured to the sleeve 118 or a duplicate thereof which may form a part of the power attachment to replace the standard sleeve on the gun.

Fluid under pressure is supplied through a socket 136 communicating with a valve chamber 138 passage from which is controlled by a valve 140. The valve is urged to its closed position as shown by a spring 142 and is adapted to be opened by a pair of levers 144 pivoted intermediate their ends on the body 124 and having a yoke portion to engage a collar 146 on the valve stem.

The lower end of the cylinder 130 communicates with a bore 148 having an inlet port 150 and an exhaust port 152 controlled by the valve 140.

In operation the nozzle 122 may be placed against a fitting and a thrust may be exerted on the feed screw 102 in the direction thereof. In response to this thrust, the housing 100 will slide in fingers 126 in the direction of the nozzle so that the end of the housing will engage the levers 144 and will move the valve 140 upwardly as seen in Figure 5. In this position, air from the valve chamber 138 will flow through inlet port 150 into the lower end of the cylinder 130 and will force the piston 132 upwardly therein to force a charge of lubricant in the cylinder 114 out through the nozzle under high pressure. When the thrust on the feed screw is released, the valve 140 will return to the position shown in Figure 5 in which exhaust port 152 is opened and fluid under pressure in the cylinder 138 can exhaust to atmosphere, allowing the piston 132 to return to the forward end of the cylinder under the influence of spring 134.

In changing from one type of lubricant to another, it is desirable to lock the gun parts in their discharge position to minimize the amount of the old lubricant remaining in the pump parts. In order to effect this, a latch 154 is pivotally mounted on the body 124 in a position to engage a suitable groove in the piston 132. Detent means may be provided if desired to hold the latch 154 in either its latched or unlatched position. When the pump is at the end of a power stroke, the latch may be operated to engage the piston, locking the pump parts in their discharge position during exchange of cartridges. When the latch is released, the piston will be free to move to the forward end of the cylinder under the influence of the spring 134.

While two embodiments of the invention have been shown and described, it will be apparent that many changes might be made therein and it is not intended to limit the scope of the invention to the forms shown or otherwise than by the terms of the appended claims.

I claim:

1. A lubricating device comprising, a lubricant supply source, a pump movably connected to said supply source, power means for operating said pump, control means for the power means and means operated by a thrust on said supply source toward the pump to operate the control means.

2. A lubricating device comprising, a lubricant supply source, a pump movably connected to said supply source, power means for operating said pump, a discharge nozzle on said pump, control means for the power means and means operated by a compressive force between the nozzle and the supply source to operate the control means.

3. A lubricating device comprising, a lubricant reservoir, a pump movably connected to said reservoir and having a discharge nozzle, power means for operating the pump, control means for the power means and means operated by relative movement between the nozzle and the reservoir to operate the control means.

4. A lubricating device comprising, a lubricant reservoir, a pump connected to said reservoir and having a discharge nozzle, power means for operating the pump, said reservoir being movable relatively toward and away from said nozzle, control means for the power means, and means operated by relative movement of the nozzle and reservoir toward and away from each other to operate said control means.

5. A lubricating device comprising, a lubricant pump, a power cylinder around said pump, a piston in said cylinder connected to the pump to operate it, a valve for controlling the supply and exhaust of operating fluid to said cylinder, a lubricant reservoir connected to the pump to supply lubricant thereto, said reservoir being movable toward and away from the cylinder, and means operated by movement of the reservoir relatively to the cylinder for operating said valve.

6. A lubricating device comprising, a body formed with a pump cylinder and a motor cylinder, interconnected pistons in said cylinders, a valve to control the supply and exhaust of actuating fluid to the motor cylinder, lubricant supply means to supply lubricant to the pump cylinder, said supply means being movably connected to said body, and means operated by movement of the supply means relatively to the body for operating said valve.

7. A lubricating device comprising, a body formed with a pump cylinder and a motor cylinder, interconnected pistons in said cylinders, a valve to control the supply and exhaust of actuating fluid to the motor cylinder, a lubricant reservoir slidably carried by said body, and a connection between the reservoir and the valve to open the valve when the reservoir is moved toward the body.

8. A lubricating device comprising, a body formed with coaxial pump and motor cylinders, a piston in said motor cylinder, a valve to control the supply and exhaust of operating fluid to the motor cylinder, a tubular plunger in the pump cylinder connected to said piston, a lubricant reservoir movable toward and away from the body and communicating with said tubular plunger, and means operated by movement of the reservoir relatively to the body to operate said valve.

9. A lubricating device comprising, a body formed with coaxial pump and motor cylinders, a piston in said motor cylinder, a valve to control the supply and exhaust of operating fluid to the motor cylinder, a tubular plunger having one end slidable in the pump cylinder and connected to said piston intermediate its ends, a cylinder secured to said body and slidably surrounding the other end of said plunger, a lubricant reservoir movably secured to said body and communicating with said last named cylinder to supply lubricant thereto, and a connection between said reservoir and said valve to operate the valve when the reservoir is moved relatively to the body.

10. A lubricating device comprising, a body formed with a motor cylinder and a pump cylinder coaxial therewith at one end thereof, a second pump cylinder secured to said body at the other end of the motor cylinder, a tubular plunger having its ends slidable in said pump cylinders respectively, a piston in said motor cylinder connected to said plunger, a valve for controlling the supply and exhaust of actuating fluid to the motor cylinder, an inlet stud on said second pump cylinder for communication with an interchangeable lubricant cartridge, a casing connected to the second pump cylinder for enclosing the cartridge, said casing being movable relatively to the body, and a connection between the casing and the valve to operate the valve.

11. A lubricating device comprising, a pump having a rigid nozzle, a motor for operating the pump, automatic control means for the motor, a source of lubricant supply for the pump movable relatively to the motor and means operable by movement of the supply source relative to the motor to admit operating fluid to the automatic control means whereby the motor will operate automatically.

12. A lubricating device comprising, a reciprocating pump, a fluid operated reciprocating motor to operate the pump, a control valve for the motor having an inlet position and an exhaust position, a lubricant reservoir slidably connected to the motor and communicating with the pump, means operated by movement of the reservoir relative to the pump to admit fluid pressure to the valve for urging the valve to its inlet position, and means responsive to operation of the motor for urging said valve to its exhaust position.

13. A lubricating device comprising, a lubricant reservoir, a pump cylinder secured to said reservoir, a plunger slidably mounted in the pump cylinder and carrying a lubricant discharge nozzle, said pump being operable by moving the plunger and reservoir relatively together, a motor connected to the plunger and the reservoir, control means for the motor, and means operated by exerting a thrust on the reservoir in the direction of said nozzle to operate the control means.

14. A lubricating device comprising, a lubricant reservoir, a pump cylinder secured to said reservoir, a plunger slidably mounted in the pump cylinder and carrying a lubricant discharge nozzle, said pump being operable by moving the plunger and reservoir relatively together, a fluid motor having a cylinder connected to the reservoir and a piston connected to said plunger, a control means for the motor, and means operated by initial movement of the reservoir toward the plunger to operate the control valve.

15. A lubricating device comprising, a lubricant reservoir, a pump cylinder secured to said reservoir, a plunger slidably mounted in the pump cylinder and carrying a lubricant discharge nozzle, said pump being operable by moving the plunger and reservoir relatively together, a motor cylinder slidably connected to the reservoir with the pump cylinder and plunger projecting therethrough, an annular piston in said motor cylinder having means for connecting it to said plunger, a control valve for controlling inlet and exhaust of operating fluid to the motor cylinder, and means operated by relative sliding movement of the motor cylinder and reservoir for operating the control valve.

16. A power attachment for a lubricating device including a reservoir and a pump comprising, a cylinder adapted to be slidably secured to the reservoir, a piston in said cylinder adapted to be connected to the pump to operate it, a valve for controlling inlet and exhaust of operating fluid to the cylinder, and valve operating means carried by the cylinder in the path of movement of the reservoir to be operated by sliding movement of the reservoir relatively to the cylinder.

17. A power attachment for a lubricating device of the type including a reservoir and a telescoping pump having a nozzle and operated by thrusting the reservoir toward the nozzle, said attachment comprising, a cylinder adapted to be secured to the reservoir with the pump projecting therethrough, an annular piston in the cylinder adapted to surround the pump and to be secured thereto, a control valve for controlling the inlet and exhaust of fluid to the cylinder, and a lever connected to the control valve for operating it, said lever carried by the cylinder in the path of movement of the reservoir to be engaged by the reservoir upon initial movement thereof toward the nozzle to operate the lever and the valve.

HARRY R. TEAR.